US012498671B2

(12) United States Patent
Kahrobaiyan et al.

(10) Patent No.: US 12,498,671 B2
(45) Date of Patent: Dec. 16, 2025

(54) FLEXIBLE GUIDE ASSEMBLY FOR A ROTARY HOROLOGICAL RESONATOR MECHANISM

(71) Applicant: The Swatch Group Research and Development Ltd, Marin (CH)

(72) Inventors: Mohammad Hussein Kahrobaiyan, Boudevilliers (CH); Gianni Di Domenico, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 346 days.

(21) Appl. No.: 18/190,381

(22) Filed: Mar. 27, 2023

(65) Prior Publication Data

US 2023/0367263 A1 Nov. 16, 2023

(30) Foreign Application Priority Data

May 10, 2022 (EP) ..................................... 22172572

(51) Int. Cl.
*G04B 17/04* (2006.01)
*G04B 17/06* (2006.01)

(52) U.S. Cl.
CPC ........... *G04B 17/045* (2013.01); *G04B 17/06* (2013.01)

(58) Field of Classification Search
CPC ....... G04B 17/045; G04B 17/06; G04B 17/04
USPC .......................................................... 368/170
See application file for complete search history.

(56) References Cited

U.S. PATENT DOCUMENTS

| | | | | |
|---|---|---|---|---|
| 2013/0176829 A1* | 7/2013 | Cusin | G04B 15/00 368/127 |
| 2017/0227930 A1* | 8/2017 | Di Domenico | G04B 17/045 |

FOREIGN PATENT DOCUMENTS

| | | | | |
|---|---|---|---|---|
| CH | 716724 A2 * | 4/2021 | G04B 35/00 |
| CH | 718 125 A2 | 6/2022 | |
| EP | 2 894 520 A2 | 7/2015 | |
| EP | 3 206 089 A1 | 8/2017 | |
| EP | 3 476 748 A1 | 5/2019 | |
| EP | 3812842 A1 * | 4/2021 | G04B 17/045 |
| EP | 3812843 A1 * | 4/2021 | G04B 15/00 |

(Continued)

OTHER PUBLICATIONS

Winkler et al. (CH 716724 A2) Machine Translation (Year: 2021).*

(Continued)

*Primary Examiner* — Regis J Betsch
*Assistant Examiner* — Kevin Andrew Johnston
(74) *Attorney, Agent, or Firm* — Sughrue Mion, PLLC

(57) ABSTRACT

A flexible guide assembly (10) including a fixed support (22) and three flexible guides arranged in series, the first flexible guide including a first movable element (23) relative to the fixed support (22), a first pair of uncrossed flexible blades (26, 27) connected to the first movable element (23), the second flexible guide including a second movable element (24) relative to the first movable element (23), a second pair of uncrossed flexible blades (28, 29) connecting the second movable element (24) to the first movable element (23), the third flexible guide including a third movable element (25) and a third pair of uncrossed flexible blades (31, 32) connecting the third movable element (25) to the second movable element (24), the third movable element (25) forming a balance or a balance support of the rotary resonator mechanism.

17 Claims, 2 Drawing Sheets

(56) References Cited

FOREIGN PATENT DOCUMENTS

| | | | | |
|---|---|---|---|---|
| JP | 2013-531257 A | 8/2013 | | |
| WO | WO-2020016131 A1 * | 1/2020 | ........... | G04B 17/045 |

OTHER PUBLICATIONS

Domenico et al. (EP 3812842 A1) Machine Translation (Year: 2021).*

European Search Report for EP 22 17 2572, dated Sep. 23, 2022.

* cited by examiner

FLEXIBLE GUIDE ASSEMBLY FOR A ROTARY HOROLOGICAL RESONATOR MECHANISM

CROSS REFERENCE TO RELATED APPLICATIONS

This application claims priority To European Patent Application No. 22172572.4 filed May 10, 2022, the entire contents of which are incorporated herein by reference.

FIELD OF THE INVENTION

The present invention relates to a flexible guide assembly for a rotary horological resonator mechanism.

The invention also relates to a rotary horological resonator mechanism equipped with such a flexible guide assembly.

BACKGROUND OF THE INVENTION

Most mechanical watches today are equipped with a sprung balance and a Swiss lever escapement mechanism. The sprung balance constitutes the time base of the watch. It is also referred to as a resonator.

The escapement has two main functions:

maintaining the to-and-fro motions of the resonator;

counting these to-and-fro motions.

The Swiss lever escapement mechanism has a low energy efficiency (approximately 30%). This low efficiency arises from the fact that the movements of the escapement are jerky, that drops or backlash occur to accommodate for machining errors, and, that several components transmit the movement thereof to each other via inclined planes which rub against each other.

An inertial element, a guide and an elastic return element are required in order to constitute a mechanical resonator. Conventionally, a balance spring acts as an elastic return element for the inertial element constituted by a balance. This balance is guided in rotation by pivots which rotate inside plain ruby bearings. This gives rise to friction, and therefore to energy losses and running disturbances, which are position-dependent, and which it is sought to remove.

Embodiments of resonators including flexible blade guides as elastic return means of the inertial element(s) are also known. Flexible guides with virtual pivots make it possible to substantially improve the efficiency of horological resonators. The simplest are crossed blade guides, composed of two crossed straight blades. However, RCC (Remote Centre Compliance) type uncrossed blade guides, which have uncrossed straight blades, also exist. Such a resonator is described in the document EP 2911012, or in the documents EP14199039, and EP16155039.

The use of a flexible guide makes it possible to replace the pivot of a balance as well as the balance spring thereof. This has the advantage of removing the pivot friction and therefore increasing the quality factor of the resonator. However, flexible guides are known to have a short angular travel (of the order of 10° to 20°, to be compared to 300° in respect of a spring balance). Long angular travel is required to ensure the proper operation of numerous mechanical escapements.

To address this problem, it has been envisaged to place several flexible blade guides in series, for example in the documents US2018319517, US2019120287 or EP3451072. Thus, a much greater angular travel is obtained. The advantage of placing several guides in series is that each guide has a low amplitude of rotation, which makes it possible to obtain good isochronism and good guidance.

Nevertheless, some drawbacks remain present, particularly the lack of control of parasitic guide movements or the effect of gravity on the flexible guide, which remains substantial.

SUMMARY OF THE INVENTION

An aim of the invention is hence that of providing a flexible guide for a rotary resonator mechanism, which avoids the problems cited above.

To this end, the invention relates to a flexible guide assembly for a rotary resonator mechanism of a horological movement, comprising a fixed support and three flexible guides arranged in series.

The flexible guide assembly is remarkable in that it extends substantially in the same plane about a longitudinal axis, the first flexible guide comprising a first movable element relative to the fixed support, a first pair of uncrossed flexible blades connected to the first movable element, such that the first movable element can move by flexion of the blades of the first pair in a circular movement about a centre of rotation, the second flexible guide comprising a second movable element relative to the first movable element, a second pair of uncrossed flexible blades connecting the second movable element to the first movable element, such that the second movable element can move relative to the first movable element and relative to the fixed support by flexion of the blades of the second pair in a circular movement about a centre of rotation, the third flexible guide including a third movable element and a third pair of uncrossed flexible strips connecting the third movable element to the second movable element, such that the third movable element can move relative to the second movable element, the first movable element and the fixed support by flexion of the blades of the third pair in a circular movement about a centre of rotation, the third movable element forming a balance or a balance support of the rotary resonator mechanism, the first movable element being arranged between the fixed support and the second movable element, the second movable element being arranged between the first movable element and the third movable element, the assembly comprising a first centre of rotation and a second centre of rotation staggered by a predefined distance belonging to the plane of the assembly.

Thanks to the invention, a flexible blade guide assembly with a sufficient angular travel, more precise parasitic movement control, and a minimisation of the effect of gravity on the running of the resonator is obtained.

Indeed, by adapting the lag between the flexible guides, it is possible to choose parasitic movements of the flexible guide assembly to control them more easily. Furthermore, this lag minimises the effect of gravity as the flexible guides do not have the same arrangement.

According to an advantageous embodiment, the fixed support extends laterally on either side of the longitudinal axis in the locking position of the assembly, the blades of the first pair of uncrossed flexible blades being connected to the lateral ends of the fixed support, so as to move closer from the fixed support to the first movable element.

According to an advantageous embodiment, the third movable element extends laterally on either side of the longitudinal axis in the locking position of the assembly, the blades of the third pair of uncrossed flexible blades being connected to the lateral ends of the third movable element, so as to move apart from the second movable element to the third movable element.

According to an advantageous embodiment, the second flexible guide and the third flexible guide form a cartwheel type pivot, the second pair of uncrossed flexible blades and the third pair of uncrossed flexible blades being symmetrical relative to the second movable element, so as to form an X in the locking position of the assembly.

According to an advantageous embodiment, the second movable element is a substantially point-shaped element arranged on the longitudinal axis in the locking position of the assembly, which assembles the second pair of uncrossed flexible blades and the third pair of uncrossed flexible blades.

According to an advantageous embodiment, the first movable element extends laterally on either side of the longitudinal axis of the assembly, the blades of the second pair of uncrossed flexible blades being connected to the lateral ends of the first movable element, so as to move closer from the first movable element to the second movable element According to an advantageous embodiment, the first movable element is a substantially point-shaped element arranged on the longitudinal axis of the assembly, which assembles the first pair of uncrossed flexible blades and the second pair of uncrossed flexible blades.

According to an advantageous embodiment, the second movable element extends laterally on either side of the longitudinal axis in the locking position of the assembly, the blades of the second pair of uncrossed flexible blades being connected to the lateral ends of the second movable element, so as to move apart from the first movable element to the second movable element.

According to an advantageous embodiment, the first movable element is rotatable about the first centre of rotation, the second and the third movable element being rotatable about the second centre of rotation.

According to an advantageous embodiment, the first and the second movable element are rotatable about the first centre of rotation, the first movable element being rotatable about the second centre of rotation.

According to an advantageous embodiment, the first centre of rotation and the second centre of rotation are arranged on the longitudinal axis in the locking position of the assembly, the centre of mass of the resonator being preferably also arranged on the longitudinal axis in the locking position of the assembly.

According to an advantageous embodiment, the fixed support and the movable elements are symmetrical relative to the longitudinal axis in the locking position of the assembly.

According to an advantageous embodiment, the flexible guide assembly is one-piece, or made from the same material, preferably silicon.

The invention also relates to a rotary resonator mechanism of a horological movement, the rotary resonator mechanism including a balance, an escape wheel and a flexible guide assembly according to the invention.

BRIEF DESCRIPTION OF THE DRAWINGS

Further features and advantages of the present invention will become apparent on reading several embodiments given merely by way of non-limiting examples, with reference to the appended drawings wherein.

DETAILED DESCRIPTION OF PREFERRED EMBODIMENTS

Figure 1:
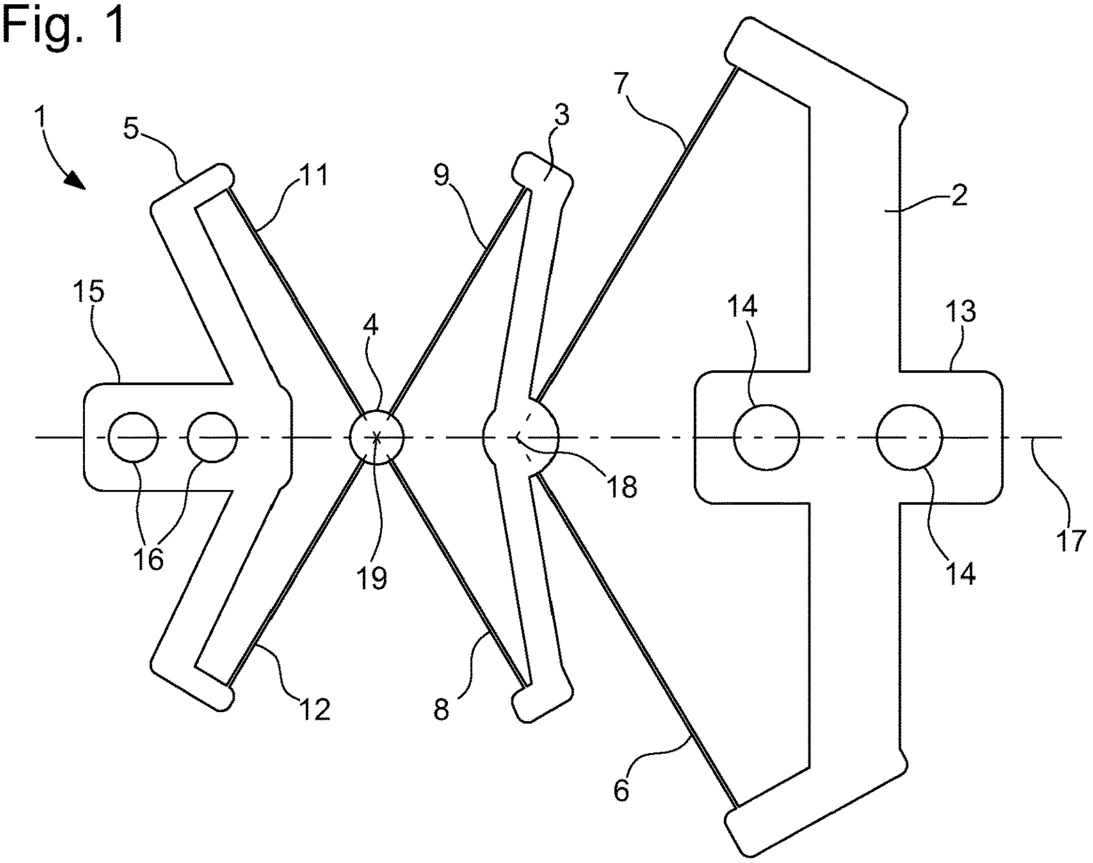
FIG. 1 schematically represents a flexible guide assembly according to a first embodiment, FIG. 2 schematically represents a flexible guide assembly according to a second embodiment of the invention, FIG. 3 schematically represents a balance fitted on the flexible guide assembly of the first embodiment, and FIG. 4 schematically represents an organ including a flexible guide assembly according to the first embodiment.

FIG. 1 shows a first embodiment of an assembly 10 of three flexible guides.

The assembly 1 comprises a fixed support 2 and three flexible guides arranged in series substantially in the same plane. The term fixed denotes that the support is intended to be immobile relative to movement.

The assembly 1 extends on either side of a longitudinal axis 17, the assembly 1 being symmetrical relative to the longitudinal axis 17 in the locking position of the assembly 1. The blades of the same pair of blades are symmetrical relative to the longitudinal axis 17 in the locking position of the assembly 1.

Preferably, the flexible guide assembly 1 is one-piece, or made from the same material, which is for example silicon.

The support 2 has an elongated rectangular plate shape arranged laterally relative to the assembly 1. The two ends of the rectangular plate are curved towards the flexible guides. In the middle of the plate, a tab 13 substantially perpendicular to the plate includes at least one orifice, here two orifices 14, to be able to assemble the plate on a disk or a disk bridge. The support extends laterally on either side of the longitudinal axis 17 of the assembly 1.

Figure 4:
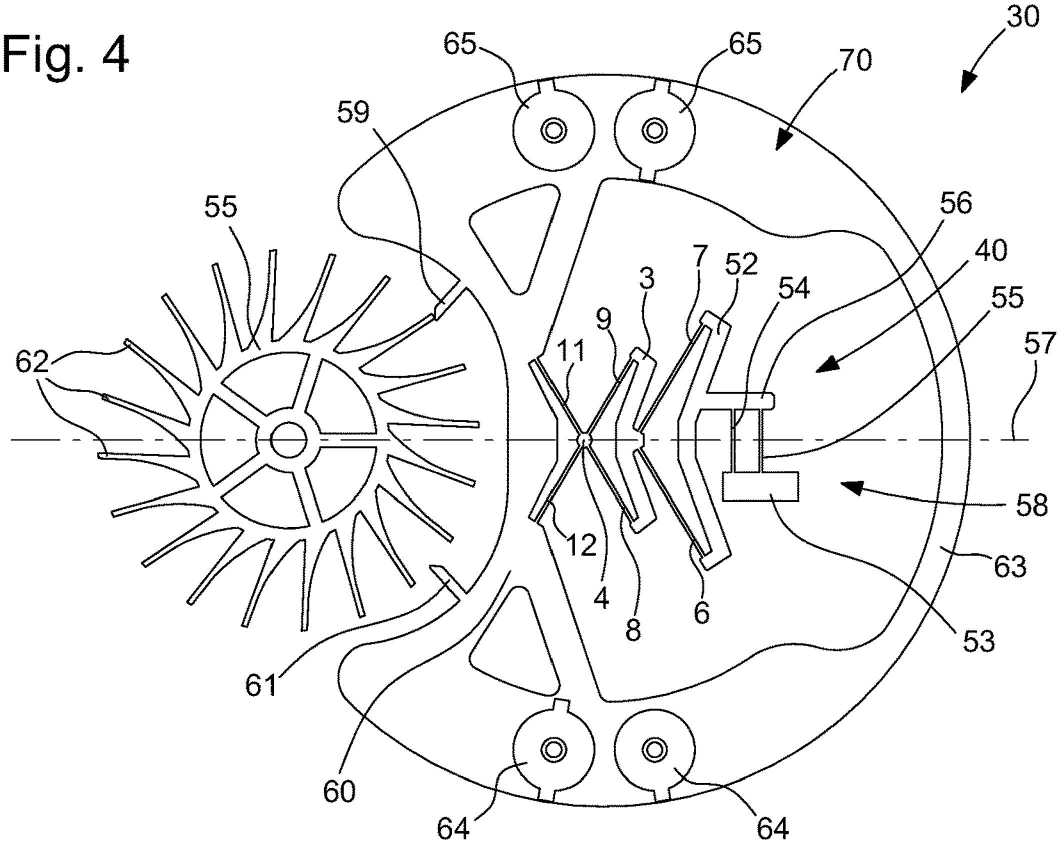

In an alternative embodiment of the flexible guide assembly 40, which is described for the rotary resonator mechanism 30 represented in FIG. 4, the support 2 is connected to a disk or a disk bridge by a translation table 58. The support 52 has no tab, but has an arm 56 extending to the rear. The arm 56 forms the translation table 58 with two flexible blades 54, 55 connecting the arm 56 to the disk or to the disk bridge 53. The translation table 58 has a shockproof function for the assembly 40 in at least one direction. By adjusting the width of the arm 56, it is possible to add a shockproof function along the second direction. The three flexible guides are substantially identical to the first embodiment, except for the third movable element, which is the balance. The regulating organ is described hereinafter in the description.

In FIG. 1, the first flexible guide comprises a first movable element 3 relative to the support 2, and a first pair of uncrossed flexible blades 7, 8 connecting the support 2 to the first movable element 3. The blades 7, 8 of the first pair of uncrossed flexible blades are connected to the lateral ends of the support 2, so as to move apart from the movable element 3 to the support 2. The flexible blades 7, 8 are connected at the middle of the first movable element 3

Thus, the first movable element 3 can move relative to the support 2 by flexion of the flexible blades 7, 8 of the first pair in a circular movement about a centre of rotation. The first movable element 3 has a drawn W shape, the base of the W being oriented towards the support 2 and the ends being oriented towards the second flexible guide.

The first movable element 3 extends laterally on either side of the longitudinal axis 17 of the assembly 1, the flexible blades 8, 9 of the second pair of uncrossed blades being connected to the lateral ends of the first movable element 3, so as to move apart from the second movable element 4 to the first movable element 3.

The second flexible guide comprises a second movable element 4 relative to the first movable element 3, and a second pair of uncrossed flexible blades 11, 12 connecting the second movable element 4 to the first movable element 3.

Thus, the second movable element 4 can move relative to the first movable element 3 by flexion of the flexible blades 8, 9 of the second pair in a circular movement about a centre of rotation.

The second movable element 4 is a substantially point-shaped element of small size relative to the first movable element 3. The second movable element 4 has the function of assembling the flexible blades 8, 9 of the second pair with the flexible blades of the third flexible guide.

The second movable element 4 connects the second pair of uncrossed flexible blades 8, 9 to the blades of the third pair of flexible blades. The second movable element 4 has for example a circular shape whereon the flexible blades 8, 9 of the second pair of blades are assembled.

The assembly 1 comprises a third flexible guide arranged in series downstream from the second flexible guide. The third flexible guide includes a third movable element 5 relative to the second movable element 4, and a third pair of uncrossed flexible blades 11, 12 connecting the third movable element 5 to the second movable element 4.

Thus, the third movable element 5 can move relative to the second movable element 4 by flexion of the flexible blades 11, 12 of the third pair in a circular movement about a centre of rotation. The third movable element 5 also has a drawn W shape with ends oriented towards the second movable element, the W being arranged substantially parallel with the first movable element 3 in the inverted position. The rear of the W is arranged outside the assembly 1. Thus, the insides of the W shapes are arranged facing each other in the locking position of the assembly 1.

The third movable element 5 further includes a tab 15 extending to the rear of the W, from the middle. The tab 15 bears at least one orifice, here two orifices 16, enabling the assembly of a balance.

Thus, the second flexible guide and the third flexible guide form a cartwheel type pivot, the second pair of uncrossed flexible blades 8, 9 and the third pair of uncrossed flexible blades 11, 12 being symmetrical relative to the second movable element 4, so as to form an X, the second movable element 4 being at the intersection of the X.

The assembly 1 comprises a first centre of rotation 18 and a second centre of rotation 19 staggered by a predefined distance.

The first centre of rotation 18 is the centre of rotation of the first flexible guide. Thus, the first movable element 3 can move relative to the support 2 in a circular movement about the first centre of rotation 18.

The second centre of rotation 19 is the centre of rotation for the second flexible guide and for the third flexible guide. Thus, the second movable element 4 and the third movable element 5 can move, respectively relative to the first movable element 3, and to the second movable element 4, in a circular movement about the second centre of rotation 19.

The centres of rotation 18, 19 are arranged substantially at the intersection of a colinear line of the blades of each pair of flexible guides in the locking position of the assembly 1.

Thus, the first centre of rotation 18 is arranged at the intersection of the colinear lines of the pair of blades 6, 7 of the first flexible guide. Here, the first 18 centre of rotation is arranged in the middle of the inner tip of the W of the first movable element 3.

The second centre of rotation 19 is arranged at the intersection of the colinear lines of the pair of blades 8, 9 of the second flexible guide and of the pair of blades 11, 12 of the third flexible guide. Here, the second centre of rotation 19 is arranged in the middle of the substantially point-shaped element of the second movable element.

Preferably, the two centres of rotation 18, 19 are arranged on the longitudinal axis 17 in the locking position of the assembly 1.

Figure 2:
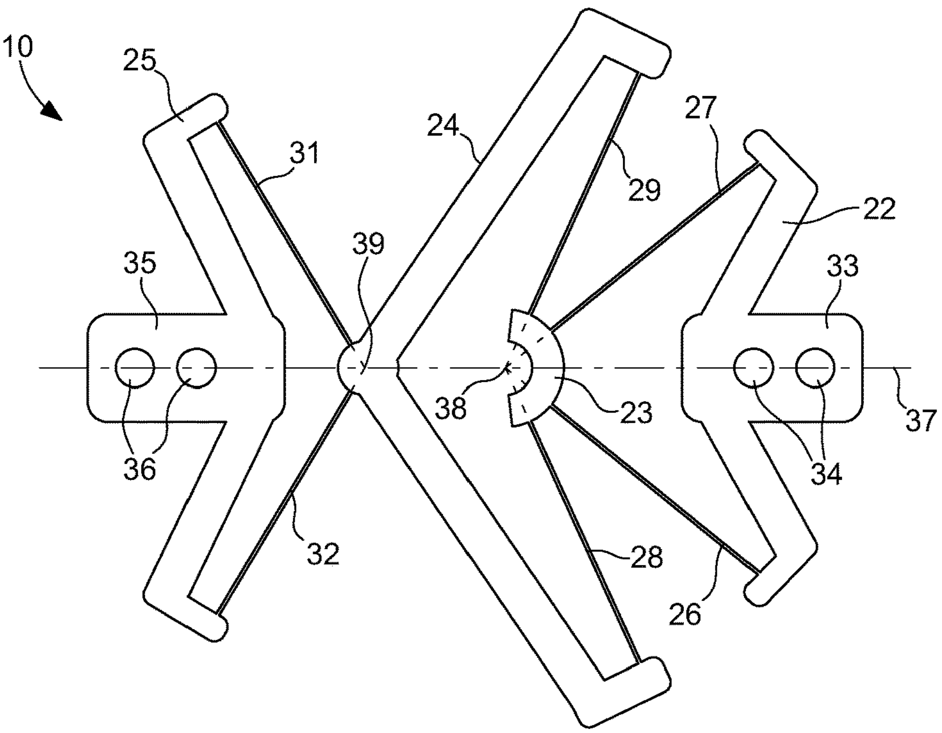

In the second embodiment of FIG. 2, the assembly 10 comprises a support 22 and three flexible guides arranged in series substantially in the same plane. The assembly 10 extends laterally on either side of a longitudinal axis 37. The flexible guide assembly 10 is symmetrical relative to the longitudinal axis 37 in the locking position. The blades of the same pair of blades are symmetrical relative to the longitudinal axis 37 in the locking position of the assembly 10.

Preferably, the flexible guide assembly 10 is one-piece, or made from the same material, which is for example silicon.

The support 22 has a drawn W shape, in which the opening and the ends are oriented towards the first flexible guide. The flexible blades 26, 27 of the first pair of flexible blades are connected to the lateral ends of the support 22, so as to move closer from the support 22 to the first movable element 23. The support 22 further includes a tab 33 extending to the rear of the W, from the tip of the middle of the W. The tab 33 bears at least one orifice, here two orifices 34, enabling the assembly of the support 22 to a disk or a disk bridge.

The first flexible guide comprises a first movable element 23 relative to the support 22, and a first pair of uncrossed flexible blades 26, 27 connecting the support 22 to the first movable element 23.

Thus, the first movable element 23 can move relative to the support 22 by flexion of the flexible blades 26, 27 of the first pair of blades in a circular movement about a centre of rotation.

The first movable element 23 is substantially point-shaped element of small size relative to the other movable elements, and which connects the first pair of uncrossed flexible blades and the second pair of uncrossed flexible blades. The first movable element 23 has for example a semi-circular shape, the circular part receiving the flexible blades 26, 27 of the first pair of flexible blades.

The second flexible guide comprises a second movable element 24 relative to the first movable element 23, and a second pair of uncrossed flexible blades 28, 29 connecting the second movable element 24 to the first movable element 23.

Thus, the second movable element 24 can move relative to the first movable element 23 by flexion of the flexible blades 28, 29 of the second pair in a circular movement about a centre of rotation.

The second movable element 24 extends laterally on either side of the longitudinal axis 37 of the assembly 10, the flexible blades 28, 29 of the second pair of uncrossed flexible blades being connected to the lateral ends of the second movable element, so as to move apart from the first movable element 23 to the second movable element 24. The second movable element 24 has a V shape with inwardly curved ends, towards the first flexible guide. The tip of the V is oriented towards the third flexible guide, whereas the opening of the V is oriented towards the first flexible guide.

The assembly 10 comprises a third flexible guide arranged in series downstream from the second flexible guide. The third flexible guide includes a third movable element 25 relative to the second movable element 24, and a third pair of uncrossed flexible blades 31, 32 connecting the third movable element 25 to the second movable element 24.

Thus, the third movable element 25 can move relative to the second movable element 24 by flexion of the flexible blades 31, 32 of the third pair in a circular movement about a centre of rotation. The third movable element 25 also has a drawn W shape with ends oriented towards the second movable element 24, the W being arranged substantially parallel with the first movable element 93 in the inverted position, so as to face the tip of the V of the second movable element 24. The third movable element 25 further includes a tab 35 extending to the rear of the W, from the middle. The tab 35 bears at least one orifice, here two orifices 36, enabling the assembly of a balance on the third movable element 25. The flexible blades of the third pair of blades move apart from the tip of the V to the curved ends of the third movable element 25.

The assembly 10 comprises a first centre of rotation 38 and a second centre of rotation 39 staggered by a predefined distance.

The first centre of rotation 38 is the centre of rotation of the first and the second flexible guide. Thus, the first movable element 23 and the second movable element 24 can move, respectively relative to the support 22 and to the first movable element 23, in a circular movement about the first centre of rotation 38.

The second centre of rotation 39 is the centre of rotation of the third flexible guide. Thus, the third movable element 25 can move relative to the second movable element 24 in a circular movement about the second centre of rotation 39.

The centres of rotation 38, 39 are arranged substantially at the intersection of a colinear line of the blades of each pair of each flexible guide in the locking position of the assembly 10.

Thus, the first centre of rotation 38 is arranged at the intersection of the colinear lines of the pair of blades 26, 27 of the first flexible guide and the colinear lines of the pair of blades 28, 29 of the second flexible guide. Here, the first 38 centre of rotation is arranged in the vicinity of the first movable element 23.

The second centre of rotation 39 is arranged at the intersection of the colinear lines of the pair of blades 31, 32 of the third flexible guide. Here, the second centre of rotation 39 is arranged at the tip of the V of the second movable element 24.

Preferably, the two centres of rotation 38, 39 are arranged on the longitudinal axis 37 in the locking position of the assembly 10.

The invention also relates to a rotary horological resonator mechanism. The resonator mechanism is equipped with a balance and a flexible guide assembly such as one of the embodiments described above.

Figure 3:
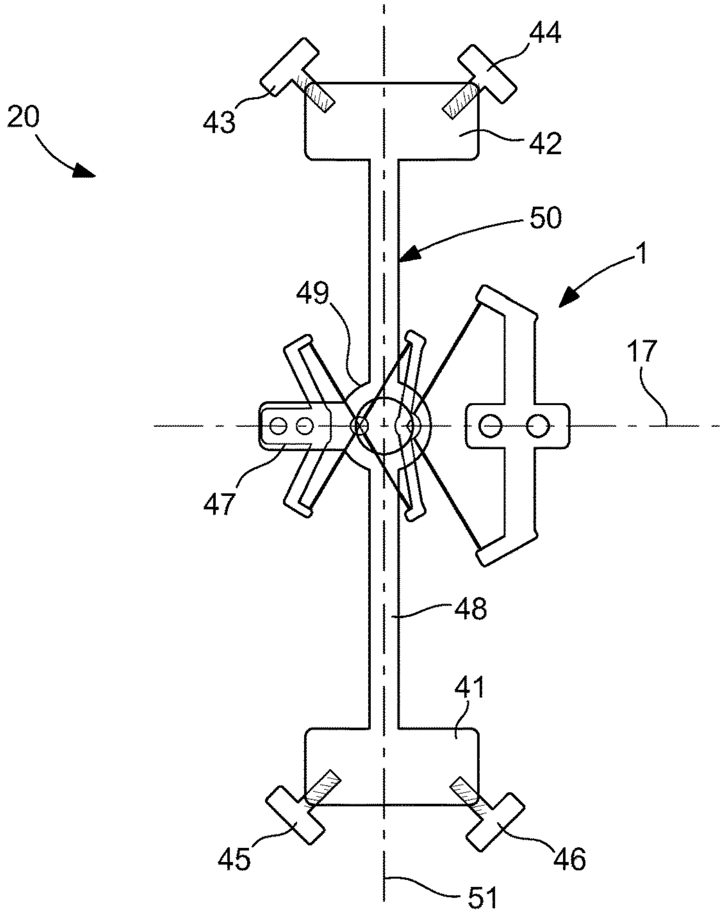

In FIG. 3, a first embodiment of a rotary resonator mechanism 20 comprising a flexible guide assembly 1 according to the first embodiment and a balance 50 is represented. The balance 50 is bone-shaped with a longitudinal segment 48 and a unit 41, 42 at each end of the longitudinal segment 48. Each unit 41, 42 is substantially parallelepipedal. Each unit 41, 42 comprises two setting screws 43, 44 arranged on the opposite corners to the longitudinal segment 48. The screws 43,44 are used to set the unbalance and the moment of inertia of the balance 50.

The balance 50 comprises a ring 49 arranged in the middle of the longitudinal segment 48 and a tab 47 stretching preferably orthogonally to the longitudinal segment 48. The tab cooperates with the two orifices of the flexible guide assembly 1, so as to be able to assemble the balance 50 with the tab of the third movable element of the flexible guide assembly 1.

The ring 49 makes it possible to cooperate with a shock-proof banking in the event of a violent shock. The banking, which is not shown in the figures, is for example arranged on the disk or a disk bridge. Such a banking prevents the breaking of one or more flexible blades of the flexible guide assembly 1.

The balance 50 is oriented perpendicularly to the longitudinal axis 17 of the flexible guide assembly 1. The tab 47 makes it possible to recentre the balance substantially towards the middle of the flexible guide assembly 1.

The moment of inertia of the balance 50 is greater about the longitudinal axis 17 of the assembly 1 than about its own longitudinal axis 51. Thus, the balance 50 oscillates perpendicularly to the longitudinal axis 17 of the assembly 1.

Thanks to the flexible guide assembly 1 according to the invention, the balance 50 can oscillate and actuate the rotary horological resonator mechanism.

A second rotary horological resonator mechanism 30 embodiment, represented in FIG. 4, comprises the alternative embodiment of the first embodiment of the flexible guide assembly 40, wherein the support 52 is connected to a disk or a disk bridge 53 by a translation table 58.

The rotary resonator mechanism 30 further includes a balance 70 and an escape wheel 55.

The escape wheel 55 has a circular shape, and comprises a plurality of peripheral teeth 62.

The balance 70 has an oval ring shape, of which a portion 60 is curved inwards. Thus, the ring comprises a majority portion 63 of which the radius of curvature is inside the ring, and the curved portion 60 of which the radius of curvature is outside the ring. Here, the majority portion 63 describes three quarters of the circumference of the ring, and the curved portion 60 describes one quarter of the circumference of the ring.

The balance 70 further comprises two pallets 59, 61 cooperating with teeth 62 of the escape wheel 55, so as to alternately lock and allow the rotation of the escape wheel 55 at a predefined frequency. The ring and the pallets 59, 61 are for example one-piece, or formed from the same material. Alternatively, the pallets are elements mounted on the ring, the pallets being for example formed by palette-stones embedded in the ring.

The curved portion 60 partially surrounds the escape wheel 55, and comprises the two pallets 59, 61 arranged on either side of the escape wheel 55. Thus, while oscillating, the balance moves the pallets 59, 61 by moving them alternately closer to and away from the escape wheel 55 to cooperate alternately with the teeth 62 of the escape wheel 55.

The flexible guide assembly 1 is arranged inside the ring of the balance 70.

In this embodiment, the third movable element is the balance 70. Thus, the flexible blades 11, 12 of the third pair of blades are connected to the balance 70, in particular to the curved portion 62, inside the ring.

The curved portion 62 comprises a drawn W-shaped side, the opening of which is oriented towards the flexible guide assembly 40, opposite the escape wheel 55. The W comprises two curved ends making it possible to assemble therewith the flexible blades 11, 12 of the third pair of blades, which extend from the second movable element 3.

The balance 70 includes unbalance setting disks, here two pairs 64, 65 of disks arranged on each side, on the majority portion 63 of the ring. The disks are inertia-blocks adjustable in rotation which make it possible to adjust the inertia and the unbalance of the balance. These disks can be made of metal, for example of NiP. The disks can have an identical unbalance in order to be able to set the running, and the position of the centre of mass of the balance 70. Or, a pair of disks with a large unbalance can be chosen in order to perform a rough setting of the running, and a pair of disks with a small unbalance in order to perform a fine setting of the running. The disks are arranged close to a vertical axis 67 perpendicular to the longitudinal axis 57, so that the moment of inertia of the balance 70 about the longitudinal axis 57 is higher and the moment of inertia about the vertical axis 67 is lower. This makes it possible to move the resonance frequencies away from undesired modes far from the main resonance of the balance 70.

In an alternative embodiment, not shown in the figures, a balance-distinct pallet assembly forms the mechanical link between the balance and the escape wheel. To this end, an impulse-pin, preferably made of ruby, is arranged in a hole in the middle of the curved portion perpendicularly to the plane of the ring. The impulse-pin cooperates with a fork of the pallet assembly to actuate the escape wheel according to usual escapement mechanisms. In this alternative, the balance includes no pallets.

It goes without saying that the invention is not limited to the embodiments described with reference to the figures and alternatives can be considered without leaving the scope of the invention.

The invention claimed is:

1. A flexible guide assembly for a rotary resonator mechanism of a horological movement, the flexible guide assembly comprising a fixed support and three flexible guides arranged in series, wherein the assembly comprises a first centre of rotation and a second centre of rotation staggered by a predefined distance along a longitudinal axis, wherein the flexible guide assembly extends in the same plane about the longitudinal axis, the first flexible guide comprising a first movable element relative to the fixed support, a first pair of uncrossed flexible blades connected to the first movable element, such that the first movable element can move by flexion of the first pair of uncrossed blades in a circular movement about the first centre of rotation, the second flexible guide comprising a second movable element relative to the first movable element, a second pair of uncrossed flexible blades connecting the second movable element to the first movable element, such that the second movable element can move relative to the first movable element and relative to the fixed support by flexion of the second pair of uncrossed flexible blades in a circular movement about the first centre of rotation or the second centre of rotation, the third flexible guide comprising a third movable element and a third pair of uncrossed flexible blades connecting the third movable element to the second movable element, such that the third movable element can move relative to the second movable element, the first movable element and the fixed support by flexion of the third pair of uncrossed flexible blades in a circular movement about the second centre of rotation, the third movable element forming a balance or a balance support of the rotary resonator mechanism, the first movable element being arranged between the fixed support and the second movable element, the second movable element being arranged between the first movable element and the third movable element.

2. The flexible guide assembly according to claim 1, wherein the fixed support extends laterally on either side of the longitudinal axis in a locking position of the assembly, the blades of the first pair of uncrossed flexible blades being connected to the lateral ends of the fixed support, so as to extend toward each other from the fixed support to the first movable element.

3. The flexible guide assembly according to claim 1, wherein the third movable element extends laterally on either side of the longitudinal axis in a locking position of the assembly, the third pair of uncrossed flexible blades being connected to the lateral ends of the third movable element, so as to extend away from each other from the second movable element to the third movable element.

4. The flexible guide assembly according to claim 1, wherein the second flexible guide and the third flexible guide form a cartwheel type pivot, the second pair of uncrossed flexible blades and the third pair of uncrossed flexible blades being symmetrical relative to the second movable element, so as to form an X in a locking position of the assembly.

5. The flexible guide assembly according to claim 4, wherein the second movable element is a circular-shaped element arranged on the longitudinal axis in the locking position of the assembly, and the second movable element being a junction for the second pair of uncrossed flexible blades and the third pair of uncrossed flexible blades.

6. The flexible guide assembly according to claim 5, wherein the first movable element extends laterally on either side of the longitudinal axis of the assembly, the blades of the second pair of uncrossed flexible blades being connected to the lateral ends of the first movable element, so as to extend away from each other from the first movable element to the second movable element.

7. The flexible guide assembly according to claim 1, wherein the first movable element is a round-shaped element arranged on the longitudinal axis of the assembly, the first movable element being a junction for the second pair of uncrossed flexible blades and the third pair of uncrossed flexible blades.

8. The flexible guide assembly according to claim 7, wherein the second movable element extends laterally on either side of the longitudinal axis in a locking position of the assembly, the blades of the second pair of uncrossed flexible blades being connected to the lateral ends of the second movable element, so as to extend away from each other from the first movable element to the second movable element.

9. The flexible guide assembly according to claim 1, wherein the second movable element is rotatable about the second centre of rotation.

10. The flexible guide assembly according to claim 1, wherein the second movable element is rotatable about the first centre of rotation.

11. The flexible guide assembly according to claim 1, wherein the first centre of rotation and the second centre of rotation are arranged on the longitudinal axis in a locking position of the assembly.

12. The flexible guide assembly according to claim 1, wherein the fixed support and the movable elements are symmetrical relative to the longitudinal axis in a locking position of the assembly.

13. The flexible guide assembly according to claim 1, wherein the flexible guide assembly is one-piece, or made from the same material.

14. A rotary resonator mechanism for a horological movement, including a balance and an escape wheel, and comprising a flexible guide assembly according to claim 1.

15. The flexible guide assembly according to claim 13, wherein the flexible guide assembly is made from silicon.

16. The rotary resonator mechanism according to claim 14, wherein the centre of mass of the resonator is arranged on the longitudinal axis in the locking position of the assembly.

17. The flexible guide assembly according to claim 1, wherein, with respect to the longitudinal axis, the first centre of rotation is between the second movable element and the fixed support, the second centre of rotation is between the first movable element and the third movable element, and the first centre of rotation is closer to the fixed support than the second centre of rotation, and wherein the second centre of rotation is positioned at a centre of the second movable element on the longitudinal axis.

* * * * *